United States Patent [19]
Halperin et al.

[11] Patent Number: 6,115,616
[45] Date of Patent: Sep. 5, 2000

[54] HAND HELD TELEPHONE SET WITH SEPARABLE KEYBOARD

[75] Inventors: Arnold Halperin, Cortlandt Manor; Joseph D. Rutledge, Mahopac; Alejandro Gabriel Schrott, New York; Charles P. Tresser, Mamaroneck; Robert Jacob von Gutfeld, New York; Chai Wah Wu, Ossining, all of N.Y.

[73] Assignee: International Business Machines Corporation, Armonk, N.Y.

[21] Appl. No.: 09/086,160

[22] Filed: May 28, 1998

[51] Int. Cl.[7] .................................................. H04Q 7/08
[52] U.S. Cl. ........................ 455/557; 455/90; 455/550; 455/575; 455/95
[58] Field of Search .................................. 455/556, 557, 455/90, 550, 11.1, 347, 348, 349, 88, 419, 420, 564, 74.1; 379/56.3, 355, 456

[56] References Cited

U.S. PATENT DOCUMENTS

| | | |
|---|---|---|
| 4,674,111 | 6/1987 | Monet et al. ............................. 379/8 |
| 4,969,181 | 11/1990 | Ito ............................................ 455/569 |
| 5,537,673 | 7/1996 | Nagashima et al. ..................... 455/346 |
| 5,553,312 | 9/1996 | Gattey et al. ........................... 455/11.1 |
| 5,608,739 | 3/1997 | Snodgrass et al. ..................... 455/11.1 |
| 5,857,157 | 1/1999 | Shindo .................................... 455/550 |
| 5,924,044 | 7/1999 | Vannatta et al. ........................ 455/556 |
| 5,946,635 | 8/1999 | Dominguez ............................. 455/558 |
| 5,974,301 | 10/1999 | Palmer et al. ............................ 455/63 |

*Primary Examiner*—William G. Trost
*Assistant Examiner*—Temica M. Davis
*Attorney, Agent, or Firm*—Whitham, Curtis & Whitham; Stephen C. Kaufman, Esq.

[57] ABSTRACT

A detachable keyboard for a telephone set is provided in the form of a keyboard card clipped to the headset, which is completely detached from the body when unclipped. Wireless communication between the handset body and keyboard is used when the card is unclipped, while contacts are activated in the clipped position so that the wireless handset then functions as in the case of a non detachable keyboard.

11 Claims, 6 Drawing Sheets

HAND HELD TELEPHONE SET WITH SEPARABLE KEYBOARD

BACKGROUND OF THE INVENTION

1. Field of the Invention

The present invention generally relates to hand held telephone sets and, more particularly, to wireless and cellular telephone handsets including a keyboard independent from the handset.

2. Background Description

Recent progresses in telecommunications have allowed wireless telephones (by which we mean telephones which are plugged into a network, but with a handset endowed with a system of wireless communication with the rest of the telephone) and cellular telephones (in which case the telephone consists of the handset) to become of current and widespread use. Thus, it is frequent to use handsets which carry the telephone dialing system (hereafter referred to as the keyboard) attached to them, which allows more freedom of motion during the use of the telephone than former usual configurations. On the other hand, the multiplication of automated answering services has led to an increased use of the keyboard during the phone communication (i.e., after finishing dialing) which, in turn, leads to uncomfortable situations where the user must put the handset in different positions to listen and talk and to use the keyboard during a communication.

SUMMARY OF THE INVENTION

It is therefore an object of the present invention to provide a way to build telephone handsets which have the usual advantages but where the keyboard can be used easily during a communication.

According to the invention, there is provided a detachable keyboard which can equip both wireless handsets and cellular phones. In the preferred embodiment, a keyboard card is clipped to the rest of the handset and is completely detached from the body when unclipped. Wireless communication between the body and keyboard is used when the card is unclipped, while contacts are activated in the clipped position so that the wireless handset then functions as in the case of a non detachable keyboard. Alternatively, one can also use a version where the keyboard card is linked to the rest of the handset by a wire and can be easily clipped and unclipped to the body of the handset. Moreover, the handset according to the invention can be easily adapted to standard wired telephones to achieve similar advantages.

The invention utilizes a keyboard that has a separate antenna and oscillator (and memory chip in the case of a digital embodiment) to permit RF (radio frequency) transmission of keyboard inputs to the handheld receiver. The keyboard may be used to respond to telephone audio prompts received by the hand-held receiver. The hand held receiver has a separate antenna and receiving unit to respond to the keyboard inputs which in turn are transmitted to the base station for appropriate distribution.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

In the following description of the preferred embodiments, we will continue using the terminology introduced so far. For definiteness, in the rest of this description, we will say the keyboard card is in the vertical position if the numbers can be read as usual from left to right, and the plane of the push buttons is vertical. The front face of the card is the one carrying the buttons, while the back face is in contact with the rest of the handset in the clipped position. When looking at the keyboard card in the vertical position, it has four edges; two horizontal ones called respectively upper and lower with no reasonable ambiguity, and two vertical ones, the left edge to the left of the observer and the right edge to the right of the observer.

Figure 1:
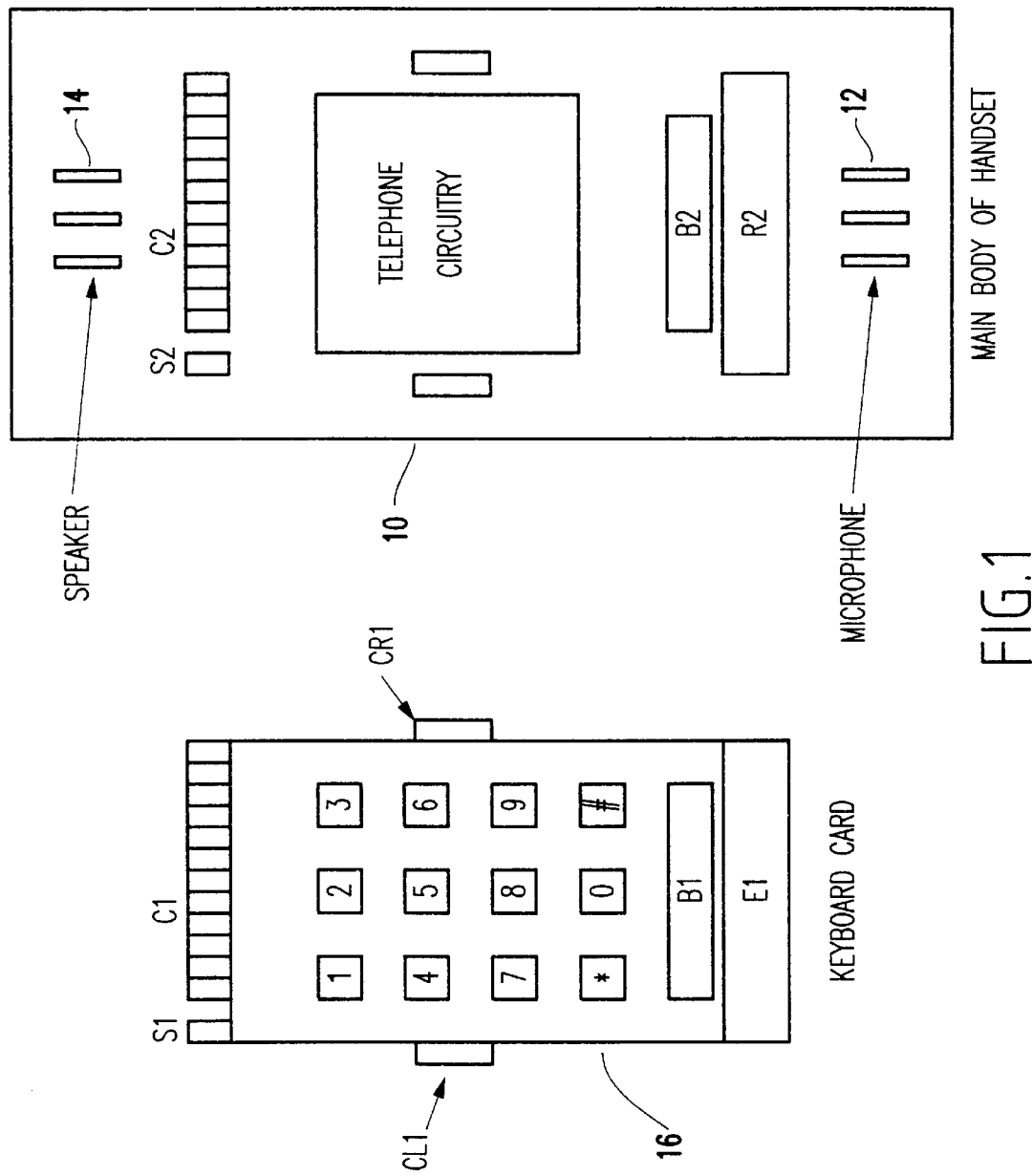
FIG. 1 is a plan view of a first preferred embodiment of the invention showing a handset with a keyboard card detached.
Figure 1A:
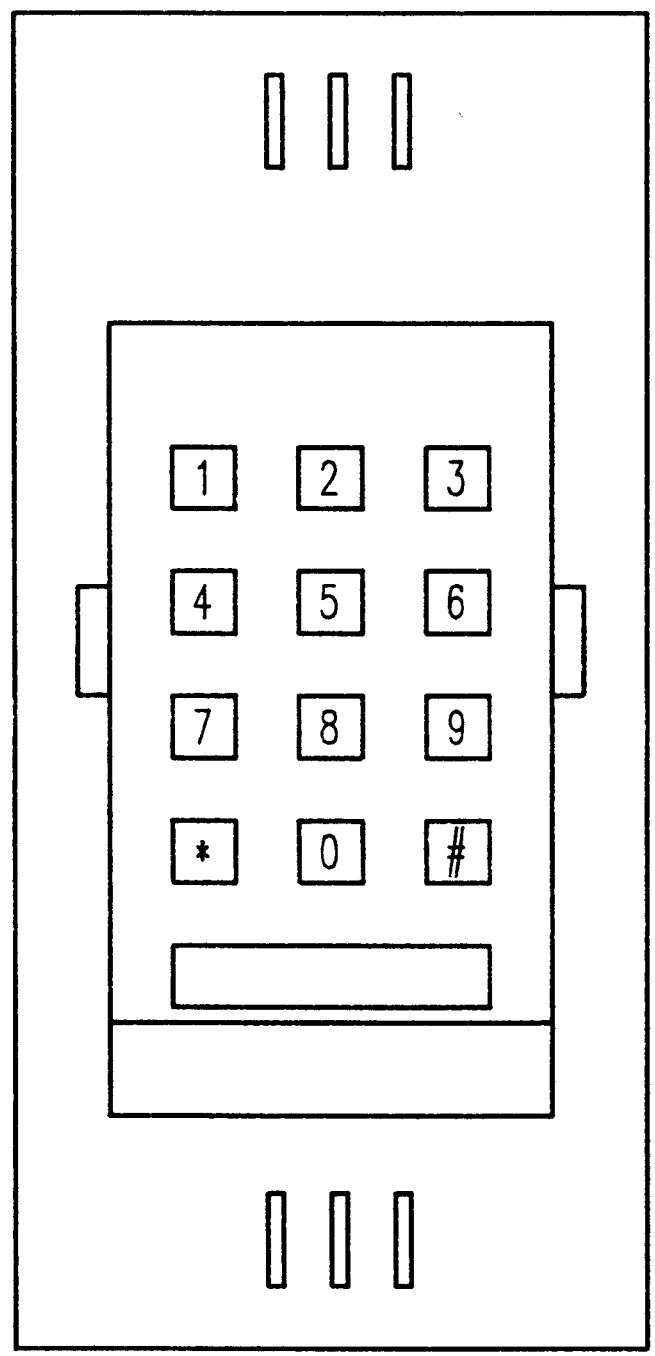
FIG. 1A is a plan view of the first embodiment showing the keyboard attached to the main body of the handset.

Referring now to the drawings, and more particularly to FIG. 1, there is shown a first embodiment of the invention. The main body of the handset 10 includes a microphone 12 and a speaker 14. The keyboard card 16 is shown detached from the main body 10, but in the clipped position is attached to the main body 10 between the microphone 12 and the speaker 14, as shown in FIG. 1A.

In the preferred embodiments, besides the usual numeric and function (star and pound) keys, the keyboard card 16 is equipped with a series of contacts C1 along one of the horizontal edges, which are hidden in the clipped position (see FIG. 1A) when they establish contact between the keys and the rest of the circuitry. These contacts C1 are deactivated in the unclipped position; their positioning on a horizontal edge is meant to minimize them being touched by the user's hands in the unclipped position and during acts of clipping and unclipping. The clips used could be any type of snap fastener, for instance.

A wireless radio frequency (RF) transmitter E1 is also provided on the keyboard card 16. This transmitter sends messages indicating which keys are pushed to the body of the handset when the card is unclipped. A switch S1 activates the contacts C1 and deactivates the transmitter E1 in the clipped position, and activates the transmitter E1 and deactivates the contacts C1 in the unclipped position.

A secondary battery B1 is provided on the keyboard card 16 and gets charged preferably whenever the main battery B2 of the handset gets charged. A pair of clips CL1 and CR1 are positioned on the two vertical sides of the keyboard card 16.

According to this first embodiment, besides the usual components for a handset, which depends in particular on whether we deal with a wireless or a cellular phone, the main body 10 of the handset is equipped with:

A series of contacts C2 which are hidden in the clipped position when they establish contact with contacts C1. These contacts are deactivated in the unclipped position.

A wireless radio frequency receiver R2 which receives the messages from transmitter E1 and relays them to the relevant parts of the circuitry when the keyboard card 16 is unclipped.

A switch S2 which activates the contacts C2 and deactivates the receiver R2 in the clipped position, and activates the receiver R2 and deactivates the contacts C2 in the unclipped position.

Instead of the wireless radio frequency (RF) transmission system between the keyboard card 16 and the main body 20 of the handset as described so far, other wireless communication systems such as infrared (IR) or ultrasound may be used. To avoid the need for a secondary battery, as well as the need of the transmitter/receiver E1–R2 combination, one can also use a wired communication between the keyboard card 16 and the main body 10. The frequent problems of wire knotting can be easily avoided for this configuration since the extension only needs to be about three feet long.

Figure 2:
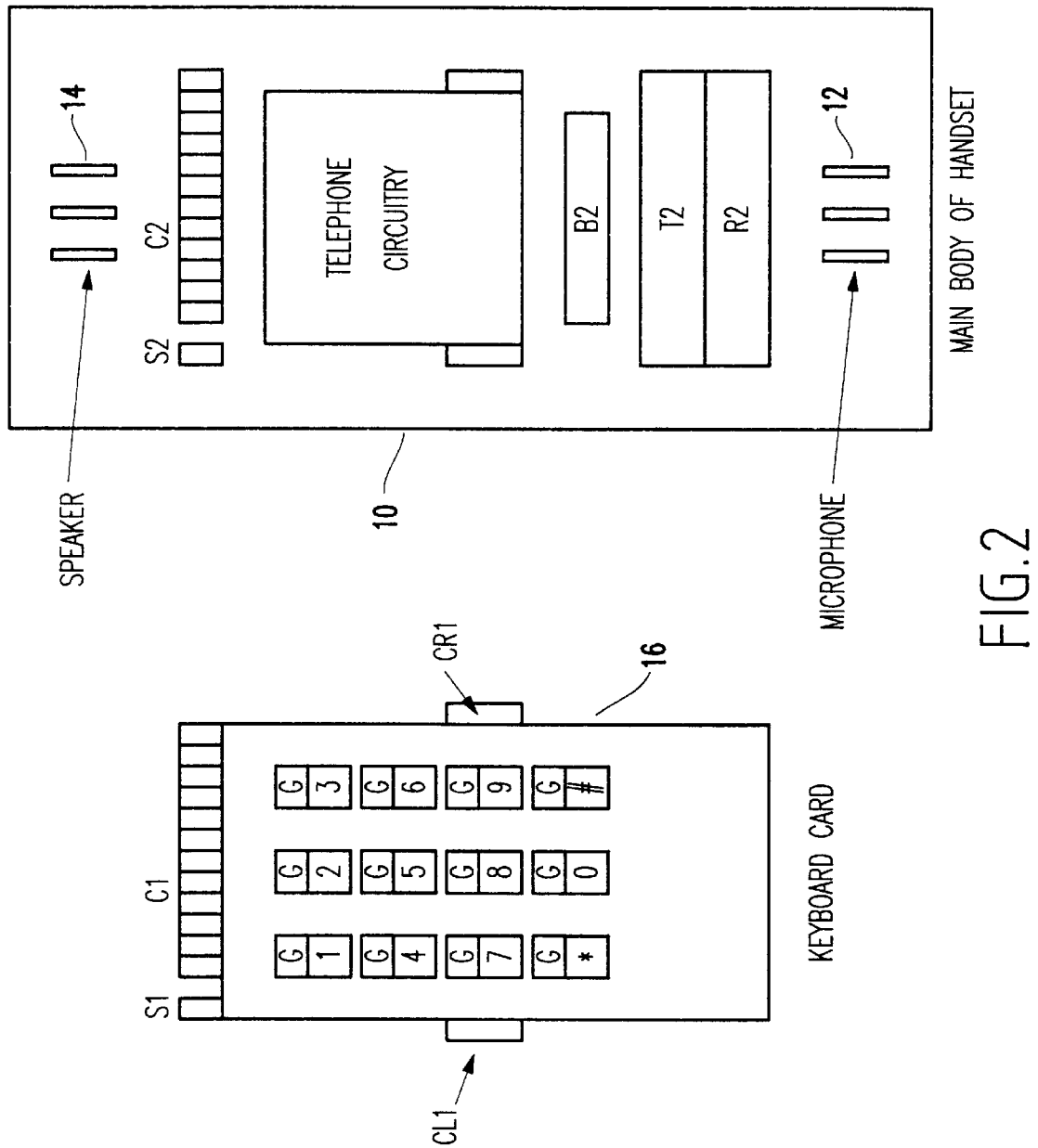
FIG. 2 is a plan view of a second preferred embodiment of the invention showing a handset with a keyboard card detached.

FIG. 2 illustrates an alternative implementation using passive tags, such as passive RFID tags. A passive RFID tag consists of an antenna and an application specific integrated electronics circuit (ASIC) in the form of a special silicon chip. The ASIC of a typical passive RFID tag comprises an oscillator to serve as a clock, a modulator, a read-only or read/write memory and a logic section. One example of a read/write memory often used in RFID tags is an EEPROM (electronically erasable programmable read only memory). In addition for both read-only and read/write tags, the silicon chip contains a capacitor to store power from the interrogation field. When queried, a portion of the power of the incident wave is quickly stored by the tag's capacitor causing the tag to become active. The various components of the electronic circuit now modulate the antenna impedance which in turn results in modulation of the reflected wave. When this modulated reflected wave is received by the base station, it is demodulated to obtain the code from the tag.

In this case, the keyboard card 16 is equipped with a series of contacts C1 along one of the horizontal edge, which are hidden in the clipped position when they establish contact between the keys and the rest of the circuitry. These contacts are deactivated in the unclipped position; their positioning on a horizontal edge is again meant to minimize touching by the user's hands in the unclipped position and during the processes of clipping and unclipping.

The keyboard card also includes: a switch S1 which activates the contacts C1 in the clipped position and deactivates the contacts C1 in the unclipped position, a pair of clips CL1 and CR1 which are positioned on the two vertical sides of the keyboard card 16, a set of passive tags G which are activated by pushing the corresponding keys on the keyboard.

Accordingly, besides the usual components for the handset, which depends in particular on whether we deal with a wireless or a cellular phone, the main body of the handset is equipped with:

A series of contacts C2 which are hidden in the clipped position when they establish contact with contacts C1. These contacts are deactivated in the unclipped position.

A wireless transmitter T2 and a wireless receiver R2 which are used to read the passive tags to determine which button has been pushed on the keyboard and relay this information to the relevant parts of the circuitry. This is only activated when the keyboard card is unclipped.

A switch S2 which activates the contacts C2 and deactivates the transmitter T2 and receiver R2 in the clipped position and activates the transmitter T2 and receiver R2 and deactivates the contacts C2 in the unclipped position.

One of the features of this alternative implementation is that the keyboard is passive; it does not have a power source or battery and no recharging is needed.

The keypad, physically separated from the hand set is operated analogously to conventional keyboard operation of modern cordless or cellular phones. In the first embodiment shown in FIG. 1, the keypad 16 has its own power source in the form of a battery, preferably a lithium thin film battery to minimize volume (space) occupied by the power source. When not in use, the keypad 16 is in a dormant or sleeping mode to conserve battery power. Only when a key is pressed on the keypad does the keypad unit switch to an active state, drawing as little as several microamps current from the battery during keypad operation before resuming its sleeping state.

Figure 3:
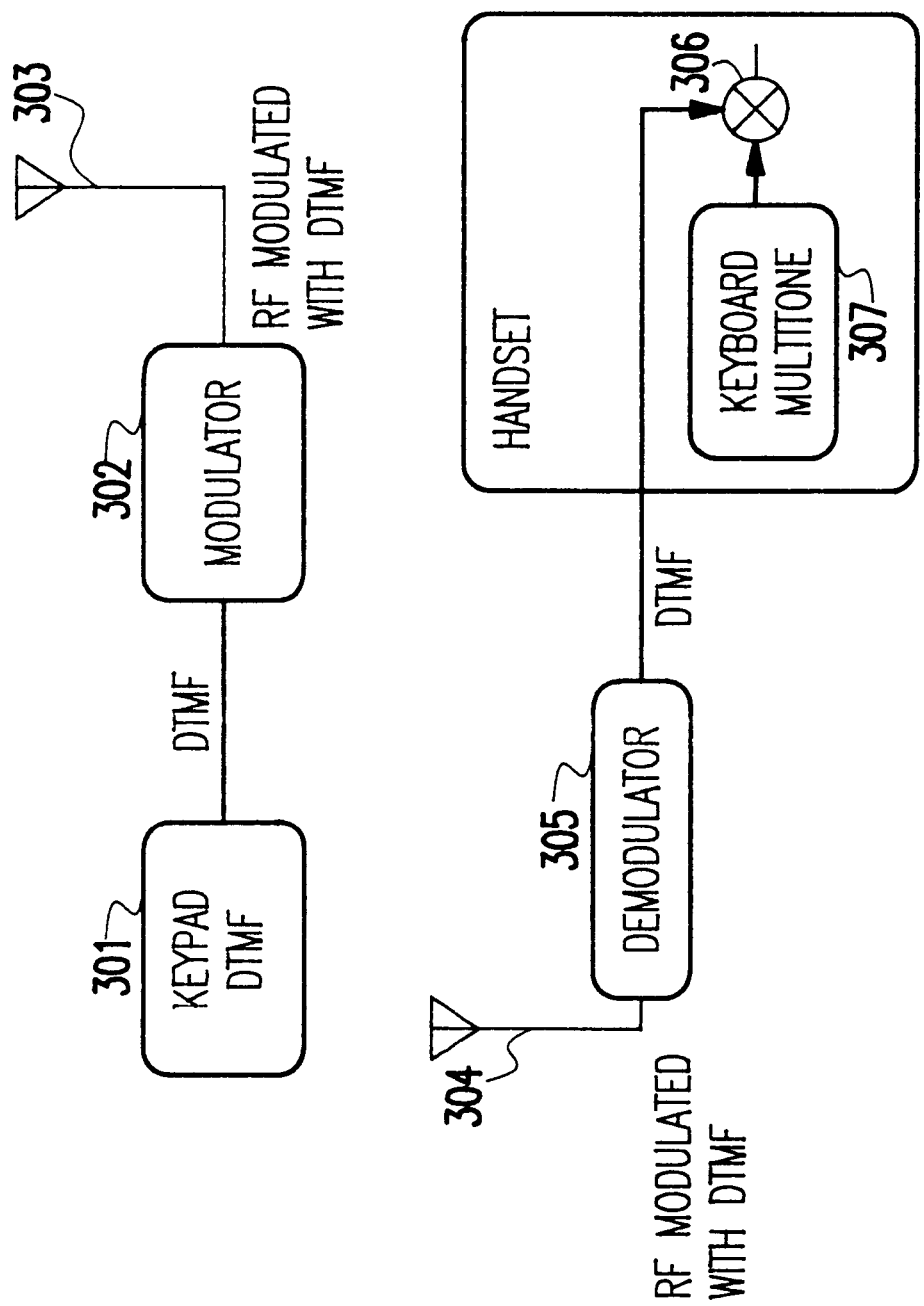
FIG. 3 is a schematic diagram of the wireless communication components of a preferred embodiment of the invention when analog dual tone, multi-frequency (DTMF) components are used.

The removable keypad using analog technology in the present invention is shown in FIG. 3. The keypad comprises a dual tone, multi-frequency (DTMF) chip 301 to generate analog signals whose frequencies are predetermined by the particular number pressed on the keypad. Thus, each key activates a different (dual tone) analog signal, the key acting as a switch both to bring the keypad out of its sleeping state while also activating the DTMF unit to send out a unique analog dual tone multi-frequency signal. Each unique analog signal is used to modulate a carrier wave produced within the modulator section 302, the output of which is connected to a small antenna 303 within or mounted on the exterior of the keypad unit.

The modulated signal is detected by an antenna 304 in or mounted on the hand set (10 in FIG. 1, for example). In the handset, the received signal is demodulated via a demodulator 305. The demodulated DTMF signal is applied to the point of contact 306 within the handset conventionally utilized by a standard portable telephone as shown. Shown also in FIG. 3 is an optional non-removable keypad 307 which may be provided in the handset so that the telephone user has a choice of either a fixed or removable keypad. Keyboard 307 may also be the removable keyboard 16 shown attached.

Figure 4:
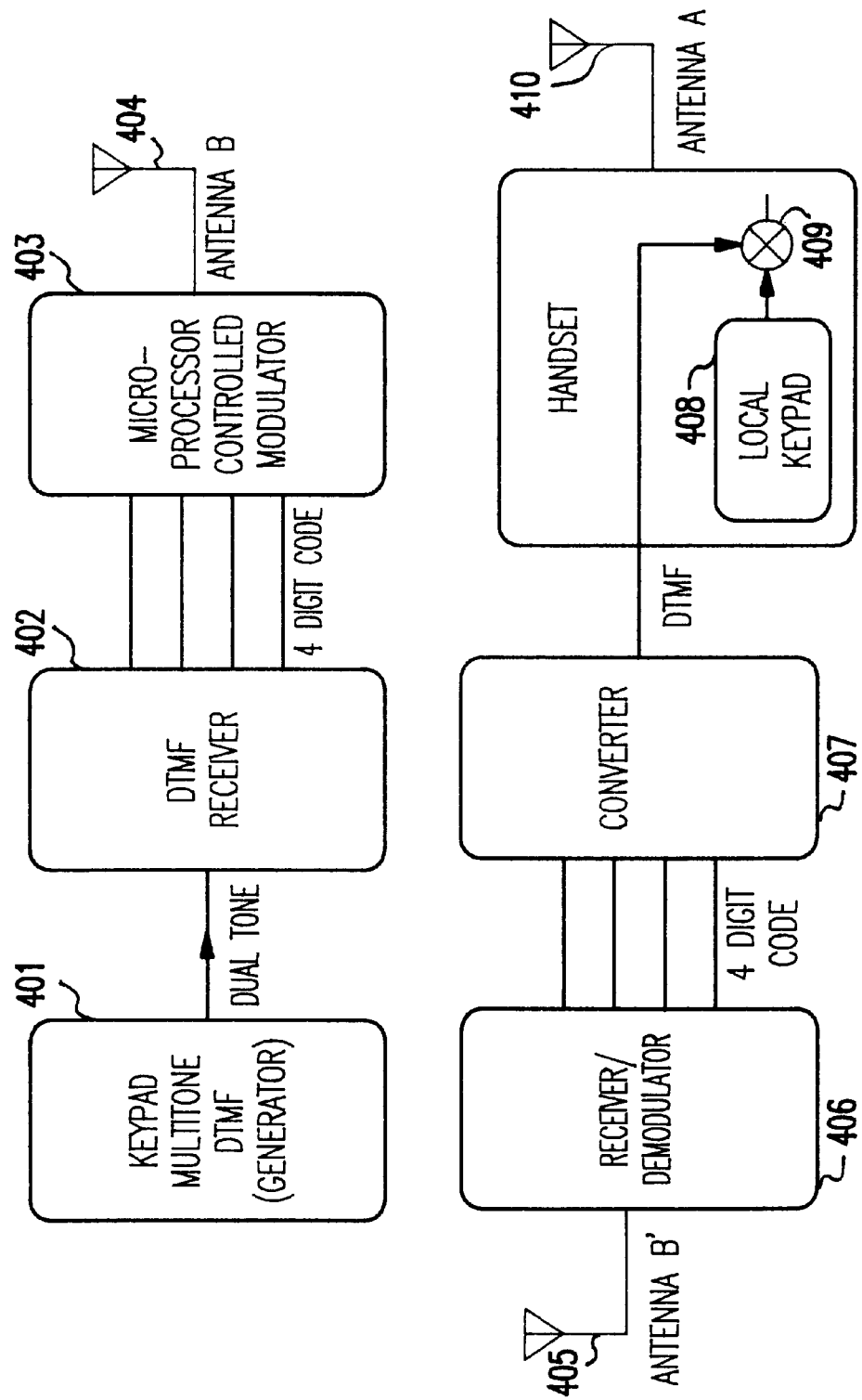
FIG. 4 is a schematic diagram of the wireless communication components of a preferred embodiment of the invention when digital codes and DTMF components are used.

FIG. 4 shows schematically the components required for digital operation, in this case in a cordless telephone. Again a DTMF generator 401 is activated by pressing any one of the keys on the keypad unit. The DTMF generator signal is connected to a DTMF receiver 402 that produces a four digit address code. This type of receiver is well known in the art and is implemented by an integrated circuit (IC) chip (for example, Motorola MC 145436A). The transmitted code is determined by the particular keypad number selected. The code is connected to a microprocessor controlled modulator 403 which contains a memory chip and is used as the address information to the chip. This chip is programmed to respond to its respective four digit address code, thereby causing a carrier wave, also generated within the modulator 403, to be modulated by the appropriate data code (which is the data code from the memory section of the chip). The antenna 404 of the keypad unit broadcasts the signal to the handset antenna 405 where it is demodulated by receiver/demodulator 406, converted by converter 407 and connected to the point 409 where keypad signals are normally generated by the optional local keypad 408 or the removable keyboard 16 shown attached. The handset is provided with an antenna 410 to broadcast signals to a base station.

Figure 5:
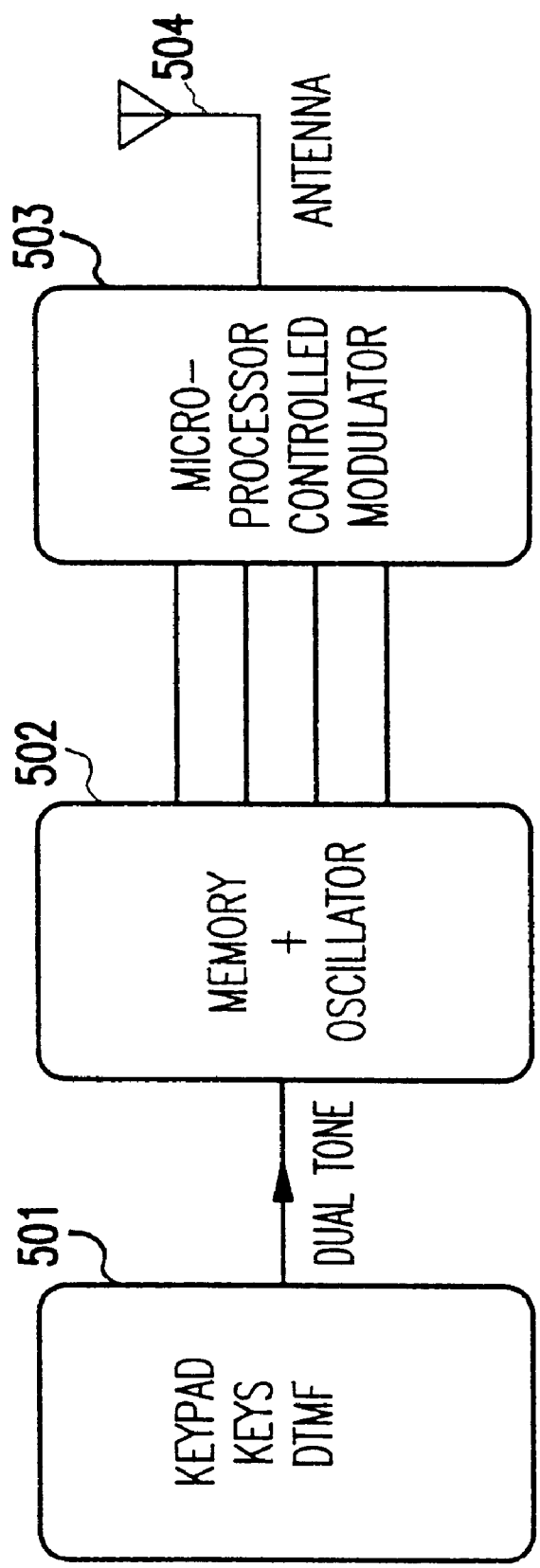
FIG. 5 is a schematic diagram of the wireless communication components of a preferred embodiment of the keyboard card of the invention when digital codes are used without the need for DTMF components.

Alternatively, for digital only operation in the keyboard as shown in FIG. 5, the DTMF generator and receiver are omitted. Instead, the keys on the keypad 501 are wired to specific locations of the memory 502 and also wired to wake up the carrier frequency generator in order to modulate the carrier generated in microprocessor controlled modulator 503 with the signal stored in the particular memory location addressed by the depressed key. The modulated carrier is broadcast by antenna 504. The handset remains the same as in FIG. 4.

When there is unused memory capacity in the microprocessor, additional codes can be programmed and stored in the handset on the EEPROM of the memory. Such information could be used for additional identification when needed for verifying charge cards or the like or whenever a PIN number is needed. To access this information for transmission, the person using the phone simply depresses one or more keys in sequence or simultaneously to cause this stored information to be transmitted.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A hand held telephone set with a separable keyboard comprising:

a handset body housing a microphone and a speaker, said handset body including a series of first contacts and a receiver and a switch which activates said first contacts and deactivates said receiver when the keyboard is attached to the handset body and activates said receiver and deactivates said first contacts when the keyboard is detached from the handset body; and a keyboard card having a numeric keypad attachable and detachable between the microphone and speaker on the handset body, said keyboard card including a series of second contacts mating with said series of first contacts, said first contacts being hidden when the keyboard card is attached to the handset, said keyboard card further including a transmitter to transmit keyboard information to the receiver in the handset, and a switch which activates the second contacts and deactivates said transmitter when the keyboard card is attached to the handset body and activates the transmitter and deactivates the second contacts when the keyboard card is detached from the handset body.

2. The hand held telephone set as recited in claim 1 wherein the receiver in the handset and the transmitter in the keyboard card are wireless.

3. The hand held telephone set as recited in claim 1 wherein the keyboard card includes a battery for powering the keyboard card when detached from the handset body.

4. The hand held telephone set as recited in claim 3 wherein the keyboard card includes circuitry which is normally in a dormant mode and activates only when a key is pressed on the key pad.

5. The hand held telephone set as recited in claim 1 wherein the transmitter in the keyboard card comprises passive tags which, when queried, modulate a reflected wave.

6. The hand held telephone set as recited in claim 1 wherein the keyboard card includes a dual tone, multi-frequency (DTMF) generator responsive to the keypad to generate DTMF signals.

7. The hand held telephone set as recited in claim 6 wherein the keyboard card further includes a modulator for modulating a carrier signal with the DTMF signals, the modulated carrier signal being broadcast to the handset body.

8. The hand held telephone set as recited in claim 6 wherein the keyboard card further includes:

a DTMF receiver for generating a multi-digit code; and a modulator responsive to the multi-digit code for modulating a carrier signal, the modulated carrier signal being broadcast to the handset body.

9. The hand held telephone set as recited in claim 1 wherein the keyboard card includes:

a memory addressed by the keypad for generating a multi-digit code; and a modulator responsive to the multi-digit code for modulating a carrier signal, the modulated carrier signal being broadcast to the handset body.

10. The hand held telephone set as recited in claim 1 wherein the telephone set is a wireless telephone.

11. The hand held telephone set as recited in claim 1 wherein the telephone set is a cellular telephone.

* * * * *